United States Patent
Manabe et al.

(10) Patent No.: US 8,492,040 B2
(45) Date of Patent: Jul. 23, 2013

(54) FUEL CELL SYSTEM AND METHOD OF CONTROLLING THE SAME

(75) Inventors: Kota Manabe, Toyota (JP); Hiroyuki Imanishi, Toyota (JP); Yuichi Sakajo, Toyohashi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 283 days.

(21) Appl. No.: 12/933,814

(22) PCT Filed: Mar. 26, 2009

(86) PCT No.: PCT/IB2009/005073
§ 371 (c)(1),
(2), (4) Date: Sep. 21, 2010

(87) PCT Pub. No.: WO2009/118619
PCT Pub. Date: Oct. 1, 2009

(65) Prior Publication Data
US 2011/0020719 A1    Jan. 27, 2011

(30) Foreign Application Priority Data

Mar. 28, 2008   (JP) ................................ 2008-085400

(51) Int. Cl.
*H01M 8/04* (2006.01)
*H01M 8/00* (2006.01)
*H01M 8/10* (2006.01)

(52) U.S. Cl.
USPC ........................................................ 429/429

(58) Field of Classification Search
USPC ........................................................ 429/429
See application file for complete search history.

(56) References Cited

U.S. PATENT DOCUMENTS

| | | | | |
|---|---|---|---|---|
| 6,953,632 | B2 * | 10/2005 | Hayashi et al. | 429/435 |
| 2004/0018402 | A1 * | 1/2004 | Takahashi | 429/13 |
| 2006/0280977 | A1 | 12/2006 | Sakajo et al. | |
| 2007/0231626 | A1 * | 10/2007 | Kurosawa | 429/13 |
| 2009/0148735 | A1 | 6/2009 | Manabe et al. | |

FOREIGN PATENT DOCUMENTS

| | | |
|---|---|---|
| EP | 1 801 906 A1 | 6/2007 |
| EP | 1 845 575 A1 | 10/2007 |
| JP | A-2002-313388 | 10/2002 |
| JP | A-2003-272680 | 9/2003 |

(Continued)

OTHER PUBLICATIONS

International Search Report in International Application No. PCT/IB2009/005073, dated Jul. 6, 2009.

(Continued)

*Primary Examiner* — Gregg Cantelmo
(74) *Attorney, Agent, or Firm* — Oliff & Berridge, PLC

(57) ABSTRACT

A fuel cell system is equipped with a drive motor, a fuel cell, and a controller. The controller performs normal electric power generation under a condition that the fuel cell is not warmed up, warm-up electric power generation with lower electric power generation efficiency than normal electric power generation, and controls performance of warm-up electric power generation on a basis of a predetermined index on a necessity to warm up the fuel cell. The controller controls an operation state of the fuel cell during warm-up electric power generation on a basis of a correlation between the system loss required for warm-up of the fuel cell and a warm-up output required for driving of a load including the drive motor during warm-up of the fuel cell.

18 Claims, 9 Drawing Sheets

FOREIGN PATENT DOCUMENTS

| | | |
|---|---|---|
| JP | A-2004-303446 | 10/2004 |
| JP | A-2006-156181 | 6/2006 |
| JP | A-2007-095561 | 4/2007 |
| JP | A-2007-184243 | 7/2007 |
| WO | WO 2007/046545 A1 | 4/2007 |
| WO | WO 2007/066795 A1 | 6/2007 |

OTHER PUBLICATIONS

Written Opinion of the International Searching Authority in International Application No. PCT/IB2009/005073, dated Jul. 6, 2009
Partial English-language Translation of Office Action in Japanese Patent Application No. 2008-085400, dated Feb. 10, 2010.

* cited by examiner

CORRELATION CHART OF MOTOR
REQUIRED VOLTAGE AND FC VOLTAGE
(WITHOUT FC STEP-UP CONVERTER)

CORRELATION CHART OF MOTOR
REQUIRED VOLTAGE AND FC VOLTAGE
(WITH FC STEP-UP CONVERTER)

CORRELATION CHART OF
BATTERY IV CHARACTERISTIC
AND FCIV CHARACTERISTIC

CORRELATION CHART OF
BATTERY IV CHARACTERISTIC
AND FCIV CHARACTERISTIC

FUEL CELL SYSTEM AND METHOD OF CONTROLLING THE SAME

BACKGROUND OF THE INVENTION

1. Field of the Invention

The invention relates to a fuel cell system that supplies a drive motor with electric power from a fuel cell generating electric power in an electrochemical reaction, and a method of controlling the fuel cell system.

2. Description of the Related Art

In recent years, fuel cells have been drawing attention as electric power supplies excellent in operation efficiency and environment friendliness. A fuel cell controls the amount of supply of fuel gas and outputs an electric power corresponding to a request from a drive motor. In some cases, however, as a result of a response delay in the amount of supply of gas, the responsiveness of the output electric power decreases, and a secondary battery is mounted as compensation. This secondary battery accumulates regenerative energy generated in reducing the speed of the drive motor and electric power generated by the fuel cell, and discharges the accumulated energy for the purpose of compensating for a decrease in the responsiveness of the fuel cell, increasing the output of an entire fuel cell system, and the like.

It should be noted herein that the fuel cell may be used in an extremely low-temperature environment. For example, in the case where an electrolyte membrane made of a polymer ion-exchange membrane is used, the interior of the electrolyte membrane needs to be held humid to generate electric power. In general, water is produced in the fuel cell through an electrochemical reaction. Accordingly, under a low-temperature environment, moisture in the fuel cell freezes, and there arises an apprehension that subsequent electric power generation through the electrochemical reaction may be hindered. Thus, there is disclosed an art for reliably generating electric power in a fuel cell even under a low-temperature environment (e.g., see Japanese Patent Application Publication No. 2006-156181 (JP-A-2006-156181). In this art, when the fuel cell is started under a low-temperature environment, the electric power generation characteristic in starting the fuel cell is improved by making the pressure of supply of gas higher than during normal electric power generation to improve the diffusion of gas supplied to gas diffusion layers in the fuel cell.

When the fuel cell is started under a low-temperature environment, the electric power generation efficiency of the fuel cell is conventionally lowered purposely to raise the amount of heat generation in the fuel cell itself and thus warm up the fuel cell itself. However, conventionally, the operation state of the fuel cell during warm-up is not mentioned, and the amount of heat generation in warming up the fuel cell is set as large as possible to prevent the fuel cell from failing to be started below freezing point. Thus, an excessive amount of energy is put into the fuel cell, and there is a high possibility of wasteful energy consumption.

Further, even when the fuel cell is started, there may be a desire to swiftly drive the drive motor supplied with electric power from the fuel cell. However, with a view to preventing the fuel cell from refreezing during start-up below freezing point, priority is given to warm-up until the temperature of the fuel cell rises to or above 0° C., and the drive motor is supplied with electric power after the completion of the warm-up. That is, a certain length of time is required until the drive motor is driven.

SUMMARY OF THE INVENTION

The invention provides a fuel cell system that ensures the driving of a drive motor supplied with electric power during warm-up of a fuel cell and makes warm-up of the fuel cell more efficient, and a method of controlling the fuel cell system.

In the invention, the operation state of a fuel cell during warm-up thereof is controlled on the basis of a correlation between a system loss required for warm-up and a warm-up output required for the driving of a load such as a drive motor or the like during warm-up. That is, the fuel cell system according to the invention is intended to control the operation of the fuel cell in consideration of the compatibility between the warm-up of the fuel cell and the driving of the load such as the drive motor or the like.

A first aspect of the invention relates to a fuel cell system equipped with a drive motor that serves as a motive power source for driving a load and is driven by an electric power, a fuel cell that carries out electric power generation through an electrochemical reaction between oxidizing gas containing oxygen and fuel gas containing hydrogen and supplies the drive motor with an electric power, normal electric power generation means for performing normal electric power generation under a condition that the fuel cell not be warmed up, warm-up electric power generation means for performing warm-up electric power generation with lower electric power generation efficiency than the normal electric power generation to cause a system loss for warming up the fuel cell, and warm-up control means for controlling performance of warm-up electric power generation by the warm-up electric power generation means on a basis of a predetermined index on a necessity to warm up the fuel cell. The warm-up control means controls an operation state of the fuel cell during warm-up electric power generation by the warm-up electric power generation means on a basis of a correlation between the system loss required for warm-up of the fuel cell by the warm-up electric power generation means and a warm-up output required for driving of a load including the drive motor during warm-up of the fuel cell.

In the aforementioned fuel cell system, an electric power generated by the fuel cell is supplied to the drive motor. In the fuel cell, normal electric power generation by the normal electric power generation means and warm-up electric power generation by the warm-up electric power generation means are performed. In the former normal electric power generation, electric power generation is performed under an environment in which there is no need to warm up the fuel cell, and preferably, the efficiency of electric power generation is relatively high. On the other hand, in the latter warm-up electric power generation, electric power generation is performed when the fuel cell needs to be warmed up, for example, when moisture in the fuel cell freezes through the exposure to a low-temperature environment and the output performance of the fuel cell has deteriorated. In this warm-up electric power generation, the electric power generation efficiency in the electrochemical reaction between oxidizing gas and fuel gas is adjusted to create a system loss as the generation of heat from, the energy of both the gases, and the fuel cell is warmed up through the system loss. Accordingly, the electric power generation efficiency during warm-up electric power generation is lower than during normal electric power generation. Various arts are disclosed to adjust the efficiency of electric power generation. For example, as one of such arts, it is possible to mention an art of making the balance between concentrations of fuel gas and oxidizing gas supplied to the fuel cell different from the balance during normal electric power generation. Further, electric power generation of a type other than normal electric power generation or warm-up electric power generation as mentioned above may be performed by the fuel cell.

In the fuel cell system according to the invention, warm-up electric power generation through the warm-up electric power generation means is performed on the basis of the predetermined index by the warm-up control means. This predetermined index serves to determine whether or not the fuel cell needs to be warmed up, and various parameters can be adopted as the index. During warm-up electric power generation, this warm-up control means controls the operation state of the fuel cell on the basis of the correlation between the system loss and the warm-up output for the operation state of the fuel cell. It should be noted herein that the system loss is a loss output (heat generation) of the fuel cell that is needed to warm up the fuel cell as described above. This system loss required for warm-up may be determined in accordance with a purpose of warming up the fuel cell, for example, in accordance with each of various purposes such as a purpose of warming up the fuel cell rapidly, a purpose of warming up the fuel cell well in advance so as to prevent the fuel cell from cooling off again, and the like. However, the system loss is preferably set as a minimum loss for preventing moisture from refreezing in the fuel cell from the standpoint of energy consumption required for warm-up. This system loss may be determined on the basis of, for example, a difference between an outside air temperature and a temperature of the fuel cell itself. Further, the warm-up output serves to enable the driving of the drive motor as demanded during warm-up (idle driving, driving at a predetermined speed, or the like), and the driving of the load in the fuel cell system.

Each of this system loss and this warm-up output is correlated with the operation state of the fuel cell, for example, an operation state defined by an output current and an output voltage. That is, with a view to outputting a required system loss, the operation state of the fuel cell can be appropriately adjusted, and with a view to outputting a required warm-up output, the operation state of the fuel cell can be appropriately adjusted. Thus, in the fuel cell system according to the invention, this system loss is considered in association with the warm-up output for the operation state of the fuel cell. The operation state of the fuel cell is thereby determined from at least two standpoints, namely, the standpoint of the system loss for warm-up and the standpoint of the warm-up output for driving the load. As a result, the operation control of the fuel cell can be performed to efficiently achieve both the outputs, namely, the system loss and the warm-up output.

In the aforementioned fuel cell system, the warm-up control means sets, as an operation state of the fuel cell during warm-up electric power generation, a predetermined operation state ensuring the compatibility between an operation state of the fuel cell in which an output corresponding to the warm-up output can be supplied and an operation state of the fuel cell in which a system loss required for warm-up of the fuel cell can be caused. Efficient electric power generation in the fuel cell based on warm-up and the driving of the load can thereby be realized.

It should be noted herein that the aforementioned fuel cell system may further be equipped with a step-up device that steps up a voltage output from the fuel cell and can supply the drive motor with the stepped-up voltage, and that the warm-up control means may step up an output voltage of the fuel cell to a predetermined drive voltage required for driving of the drive motor via the step-up device during warm-up of the fuel cell, and supply the drive motor with the output voltage. In general, as an electric characteristic of the fuel cell, the output current of the fuel cell tends to increase but on the other hand, the output voltage thereof tends to decrease when the electric power generation efficiency of the fuel cell is lowered to raise the system loss. Thus, the fuel cell system is equipped with the step-up device as described above. Thus, even when the output voltage of the fuel cell decreases due to warm-up electric power generation, the voltage is stepped up by the step-up device to thereby cover the predetermined drive voltage required for the driving of the drive motor.

Further, in any one of the fuel cell systems mentioned above, the warm-up control means may adjust a magnitude of the system loss for the operation state of the fuel cell on a basis of a predetermined difference between an outside air temperature of the fuel cell and a temperature of the fuel cell itself for the operation state of the fuel cell, and control the operation state of the fuel cell during warm-up electric power generation on a basis of the adjusted system loss and the warm-up output. By determining the magnitude of the system loss required for warm-up of the fuel cell, the amount of energy consumed to warm up the fuel cell can be prevented from becoming unnecessarily large. In determining the system loss on a basis of the predetermined difference, a loss uniquely corresponding to the predetermined difference in temperature may be determined as the system loss. Alternatively, one of a plurality of system losses determined in advance may be selected on the basis of the predetermined difference in temperature.

It should be noted herein that in any one of the fuel cell systems mentioned above, the warm-up control means may control the operation state of the fuel cell during warm-up electric power generation to an operation state determined on a basis of a current-voltage characteristic of the fuel cell in a state requiring warm-up to render an output of the fuel cell in a predetermined high output state when the warm-up output is higher than a predetermined value. In the case where the fuel cell needs to be warmed up, the output thereof is often lower than during normal electric power generation. Thus, when the warm-up output is higher than the predetermined value, namely, when the output to be output by the fuel cell to drive the load including the drive motor is relatively high, the output state of the fuel cell is controlled to the predetermined high output state to thereby make it possible to cover a highest possible output for driving the load. The predetermined high output state mentioned herein is preferably an output state in which the output of the fuel cell is at its maximum. However, the predetermined high output state may also be an output state in the vicinity of a maximum output state in which an output making it possible to contribute to the driving of the load can be formed.

It should be noted herein that the applicant has found out that the output voltage of the fuel cell corresponding to a maximum output thereof tends to be substantially constant regardless of a surrounding environment in which the fuel cell needs to be warmed up in the current-voltage characteristic of the fuel cell. Thus, the warm-up control means may control the operation state of the fuel cell during warm-up electric power generation such that the output voltage of the fuel cell becomes equal to a certain predetermined output voltage that renders the output of the fuel cell in the predetermined high output state, on the basis of the current-voltage characteristic of the fuel cell in a state requiring warm-up. By controlling the amount of oxidizing gas supplied to the fuel cell with the output voltage of the fuel cell controlled to the constant voltage as described above, efficient warm-up electric power generation of the fuel cell is made possible in a wide output range from a low output to a high output corresponding to the state of the fuel cell, under the control relatively easy to perform.

In each of the aforementioned fuel cell systems, the fuel cell system may be mounted on a mobile object, and the predetermined value may be a minimum value required during movement of the mobile object in warming up the fuel cell when the mobile object moves by being driven by the drive motor. Thus, with a view to allowing the mobile object to move more reliably, the operation state of the fuel cell during warm-up electric power generation is controlled to render the output from the fuel cell in a predetermined maximum output state in that case.

Further, in any one of the fuel cell systems mentioned above, the warm-up control means may perform warm-up electric power generation of the fuel cell such that a system heat budget in the fuel cell during warm-up becomes equal to or larger than zero. Thus, the temperature of the fuel cell in a state requiring warm-up is raised.

Further, in any one of the fuel cell systems mentioned above, the warm-up control means may perform warm-up electric power generation by the warm-up electric power generation means when the fuel cell is started or when the normal electric power generation is performed in the fuel cell and the temperature of the fuel cell itself becomes equal to or lower than a predetermined temperature requiring warm-up. That is, the fuel cell is warmed up by the warm-up control means in the aforementioned fuel cell system not only when the fuel cell needs to be warmed up right after startup but also when normal electric power generation is once performed after the startup of the fuel cell and the temperature of the fuel cell again assumes a state requiring warm-up, namely, when the water produced through electric power generation may freeze. Thus, the necessity to warm up the fuel cell can be efficiently fulfilled in any situation in which the fuel cell is in operation.

Further, in any one of the fuel cell systems mentioned above, the warm-up control means may shift electric power generation in the fuel cell to normal electric power generation by the normal electric power generation means when the temperature of the fuel cell itself becomes equal to a warm-up end temperature through warm-up electric power generation by the warm-up electric power generation means. Warm-up electric power generation is lower in efficiency than normal electric power generation. Therefore, when there is no need to perform warm-up electric power generation, it is preferable to make a shift from the warm-up electric power generation to the normal electric power generation from the standpoint of energy consumption as well.

Further, in any one of the fuel cell systems mentioned above, the warm-up control means may limit a minimum operation voltage of the fuel cell to a hydrogen pumping suppression voltage at which a concentration of hydrogen generated on a cathode side of the fuel cell as a result of the warm-up electric power generation is equal to or lower than a predetermined reference concentration in controlling the operation state of the fuel cell during warm-up electric power generation by the warm-up electric power generation means when the warm-up electric power generation means makes a concentration of oxygen supplied to the fuel cell lower than a concentration of oxygen supplied to the fuel cell during the normal electric power generation to thereby perform the warm-up electric power generation.

The warm-up electric power generation means reduces the concentration of oxygen supplied to the fuel cell, and the efficiency of the electric power generation performed in the fuel cell is lowered. As a result, the aforementioned warm-up electric power generation can be performed. However, in this case, the concentration of oxygen supplied to the cathode side of the fuel cell decreases. Therefore, there may arise a so-called hydrogen pumping phenomenon in which hydrogen molecules are formed on the cathode side through protons that have moved from an anode side. Then, when the operation voltage of the fuel cell during warm-up electric power generation is reduced, the concentration of hydrogen produced through this hydrogen pumping phenomenon is high. Therefore, the warm-up control means limits the minimum value of the operation voltage of the fuel cell during warm-up electric power generation to the hydrogen pumping suppression voltage, thereby preventing the concentration of hydrogen produced on the cathode side from rising excessively. The warm-up control means may set the hydrogen pumping suppression voltage so as to substantially prevent the occurrence of the hydrogen pumping phenomenon itself.

A second aspect of the invention relates to a method of controlling a fuel cell system equipped with a drive motor and a fuel cell that supplies the drive motor with electric power. This control method includes a step of determining whether or not the fuel cell needs to be warmed up, a step of calculating a system loss required for warm-up of the fuel cell, a step of calculating a warm-up output required for driving of a load including the drive motor during warm-up of the fuel cell, and a step of controlling an operation state of the fuel cell during warm-up electric power generation on a basis of the calculated system loss and the calculated warm-up output when it is determined that the fuel cell needs to be warmed up.

According to the fuel cell system according to the invention, it is possible to ensure the driving of the drive motor that is supplied with electric power during warm-up of the fuel cell, and to make warm-up of the fuel cell more efficient.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

An embodiment of a fuel cell system 10 according to the invention will be described in detail on the basis of the drawings. The fuel cell system 10 according to this embodiment of the invention supplies electric power to a drive motor 16 as a drive unit of a vehicle 1 as a mobile object, but is also applicable to a mobile object other than the vehicle 1, such as a ship, a robot, or the like, or an object that does not move but needs to be supplied with electric power.

Figure 1:
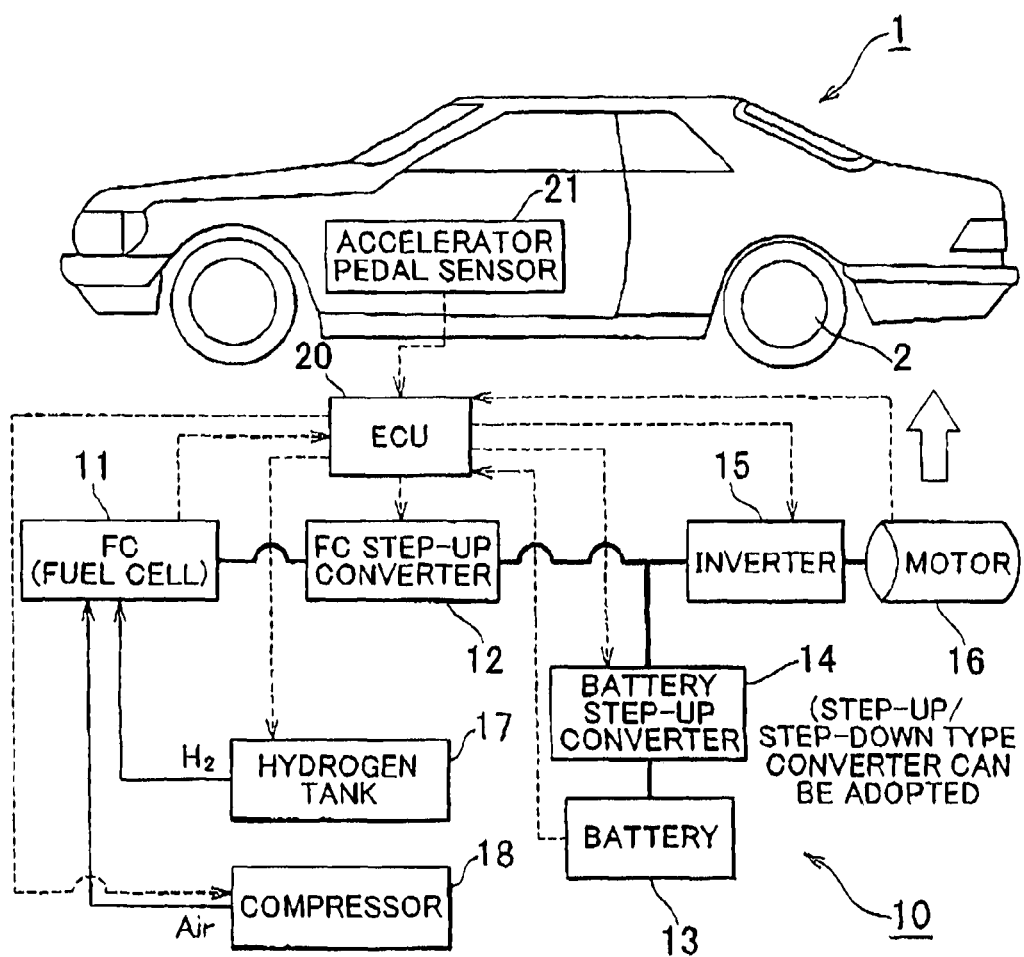
FIG. 1 is a view showing a schematic configuration of a fuel cell system according to an embodiment of the invention.

FIG. 1 schematically shows an overall configuration of the fuel cell system 10, and the vehicle 1 as a mobile object that uses electric power supplied from the fuel cell system 10 as a drive source. The vehicle 1 runs by itself and can move through the driving of driving wheels 2 by a drive motor (hereinafter referred to simply as "the motor") 16. This motor 16 is a so-called three-phase motor, and is supplied with alternating electric power from an inverter 15. In addition, this inverter 15 is supplied with direct-current electric power from a fuel cell 11 (hereinafter referred to also as "the FC") as a main electric power supply of the fuel cell system 10 and a battery 13 as a secondary battery, and converts the direct-current electric power into alternating electric power.

It should be noted herein that the fuel cell 11 generates electric power through an electrochemical reaction of hydrogen gas stored in a hydrogen tank 17 and oxygen in air force-fed by a compressor 18, and an FC step-up converter 12 as a step-up type DC-DC converter is electrically connected between the fuel cell 11 and the inverter 15. Thus, an output voltage from the fuel cell 11 is stepped up to an arbitrary voltage within a range controllable by the FC step-up converter 12, and is applied to the inverter 15. Further, the terminal voltage of the fuel cell 11 can also be controlled through step-up operation of this FC step-up converter 12.

Further, the battery 13 is an accumulation device capable of being charged with electric power and discharging electric power therefrom, and a step-up type battery step-up converter 14 is electrically connected between the battery 13 and the inverter 15 in parallel with the FC step-up converter 12 with respect to the inverter 15. Thus, an output voltage from the battery 13 is stepped up to an arbitrary voltage within a range controllable by the battery step-up converter 14, and is applied to the inverter 15. Then, the terminal voltage of the inverter 15 can also be controlled through step-up operation of this battery step-up converter 14. As shown in FIG. 1, in the fuel cell system 10, a step-up/step-down type converter capable of performing step-up operation and step-down operation can also be adopted instead of the step-up type battery step-up converter 14. In the following embodiment of the invention, the description will be given mainly on the assumption that the battery step-up converter 14 is employed as a step-up type converter. However, this description has no intention of limiting the adoption of a step-up/step-down type converter. An appropriate adjustment is made when such a step-up/step-down type converter is adopted. Further facts to be noted due to the adoption of the step-up/step-down type converter will be disclosed in an appropriate manner.

Further, the vehicle 1 is equipped with an electronic control unit (hereinafter referred to as "the ECU") 20, which is electrically connected to various control targets as described above to control the generation of electric power from the fuel cell 11, the driving of the motor 16, and the like. For example, the vehicle 1 is provided with an accelerator pedal receiving a request for acceleration from a user, and an opening degree of the accelerator pedal is detected by an accelerator pedal sensor 21. A detection signal of the accelerator pedal sensor 21 is electrically transmitted to the ECU 20. Further, the ECU 20 is also electrically connected to an encoder for detecting a rotational speed of the motor 16, and the rotational speed of the motor 16 is thus detected by the ECU 20. The ECU 20 can perform various types of control on the basis of these detected values and the like.

In the fuel cell system 10 configured as described above, an opening degree of the accelerator pedal depressed by the user of the vehicle 1 is detected by the accelerator pedal sensor 21, and the ECU 20 appropriately controls the amount of electric power generated by the fuel cell 11 and the amount of electric power with which the battery 13 is charged or which is discharged from the battery 13, on the basis of the opening degree of the accelerator, the rotational speed of the motor 16, and the like. The FC step-up converter 12 is provided between the fuel cell 11 and the inverter 15, and the battery step-up converter 14 is provided between the battery 13 and the inverter 15 as well. The voltage supplied to the inverter 15 can thereby be made high. Although mentioned already, a step-up/step-down type converter can also be adopted instead of this battery step-up converter 14.

By configuring the fuel cell system 10 with the FC step-up converter 12 included therein as described above, the motor 16 can be driven through step-up operation of the FC step-up converter 12 even when the output voltage (inter-terminal voltage) of the fuel cell 11 itself is low. Therefore, it is also possible to reduce the size of the fuel cell system 10 by, for example, reducing the number of cells laminated in the fuel cell 11. As a result, the weight of the vehicle 1 can be reduced, and an improvement in fuel consumption thereof can further be promoted.

Figure 2:
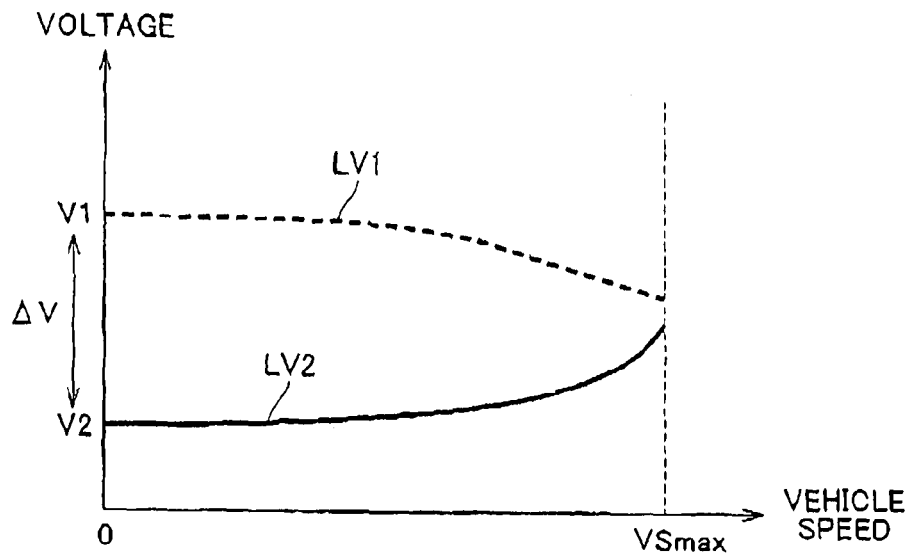
FIG. 2 is a view showing a correlation between an output voltage of a fuel cell and a motor required voltage for driving a motor, which is set in a conventional fuel cell system.

It should be noted herein that the efficiency of the system can be enhanced by performing intermittent operation control of the FC step-up converter 12. Focusing attention on a relationship among the fuel cell 11, the inverter 15, and the motor 16 for convenience of explanation, electric power from the fuel cell 11 as a main electric power supply for the motor 16 is supplied to the inverter 15 side via the FC step-up converter 12. Then, the voltage to be applied to the inverter 15 by the fuel cell 11 as the main electric power supply in driving the motor 16 must be a voltage capable of sufficiently resisting an inverse electromotive force of the motor 16. Accordingly, in the conventional fuel cell system unequipped with the FC step-up converter 12, as shown in FIG. 2, in a speed range (0 to VSmax) assumable by the vehicle 1, a voltage applied by the fuel cell, which is denoted by LV1, must always be higher than a voltage to be applied to the inverter 15, which is required for the driving of the motor (hereinafter referred to as "the motor required voltage"). Thus, in a range where the vehicle speed is low, an output voltage from the fuel cell, which is much higher than the voltage to be applied to the inverter, is applied to the inverter, and there is a great switching loss of the inverter. Especially in the range where the speed of the vehicle 1 is low, the switching loss of the inverter is remarkable, which is undesirable in view of energy conservation.

It should be noted herein that the fuel cell system 10 is provided with the FC step-up converter 12, and that the voltage from the fuel cell 11 can therefore be stepped up and applied to the inverter 15. However, in step-up operation performed by this FC step-up converter 12, some switching loss is caused by a switching element included therein. Therefore, the step-up operation constitutes a factor in a decrease in the efficiency of the system. On the other hand, as described above, the motor 16 is a motor designed with high voltage and low current. Therefore, the inverse electromotive voltage generated by the motor 16 increases as the rotational speed thereof rises. Thus, the step-up operation by the FC step-up converter 12 is indispensable.

Figure 3:
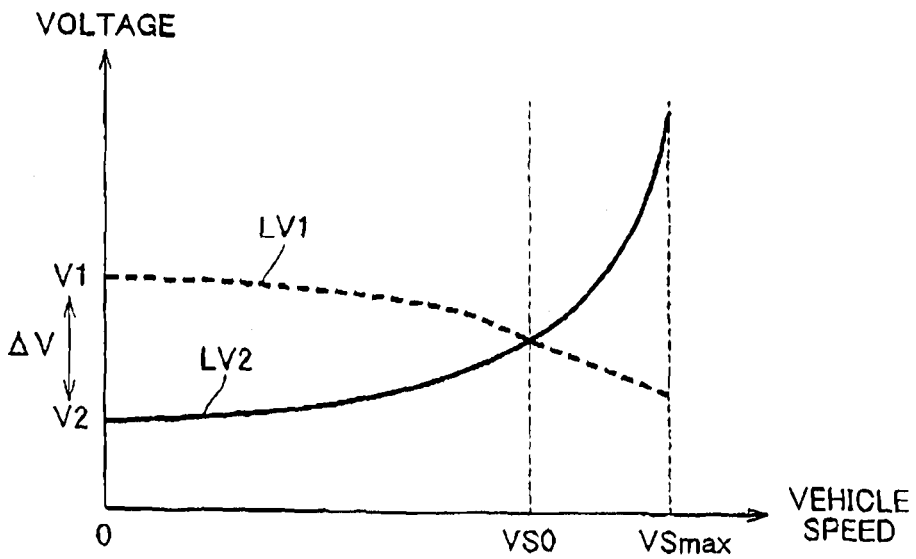
FIG. 3 is a view showing a correlation between an output voltage of a fuel cell and a motor required voltage for driving a motor, which is set in a fuel cell system according to the embodiment of the invention.

Thus, correlations between the output voltage from the fuel cell 11 and the motor required voltage to be applied to the inverter 15 are denoted by LV1 and LV2 respectively in FIG. 3. As indicated by LV2 in FIG. 3, the inverse electromotive voltage of the motor 16 increases as the speed of the vehicle 1 increases. Therefore, the motor required voltage also increases as the vehicle speed increases. It should be noted herein that in the correlation between the output voltage LV1 of the fuel cell 11 and the motor required voltage LV2, it is appropriate to determine a voltage characteristic of the fuel cell 11 and a voltage characteristic of the motor 16 such that a speed VS0 of the vehicle 1 at a time when the output voltage LV1 of the fuel cell 11 and the motor required voltage LV2 intersect with each other becomes equal to a speed substantially ensuring normal operation of the vehicle 1 by the user. In this embodiment of the invention, the speed VS0 is set as 110 km/h from a tendency of normal operation by the user or the like. Then, a maximum output of the motor 16 during driving, which makes it possible for the vehicle 1 to run at this speed VS0, is calculated, and a voltage to be applied to the inverter 15 (motor required voltage) is derived such that the maximum output can be achieved. Then, the fuel cell 11 is designed such that this motor required voltage can be directly output from the fuel cell 11 without the intermediary of the FC step-up converter 12 (e.g., in a fuel cell formed by laminating a plurality of cells on one another, the number of the laminated cells is adjusted).

In the fuel cell system 10 including the fuel cell 11 designed as described above, until the speed of the vehicle 1 reaches VS0, the output voltage from the fuel cell 11 is higher than the motor required voltage for driving the motor 16. Therefore, even in the case where the motor 16 is designed with high voltage and low current, the motor 16 can be driven through a direct output voltage from the fuel cell 11 even without step-up operation of the FC step-up converter 12. In other words, under this condition, the driving of the motor 16 can be ensured by stopping the switching operation by the FC step-up converter 12 and applying the output voltage from the fuel cell 11 to the inverter 15. Thus, the switching loss in the FC step-up converter 12 can be completely excluded. Furthermore, the voltage applied to the inverter 15 does not become excessively high due to the stoppage of the FC step-up converter 12. That is, the difference in voltage between LV1 and LV2 can be held smaller than in the state shown in FIG. 2. Therefore, the switching loss in the inverter 15 can be held low. In this FIG. 3, the drive range of the motor 16 where the output voltage of the fuel cell 11 is higher than the motor required voltage (the drive range of the motor 16 where the vehicle 1 runs at a speed of 0 to VS0) can be regarded as the predetermined drive range according to the invention.

On the other hand, when the vehicle speed of the vehicle 1 becomes equal to or higher than VS0, the motor required voltage for driving the motor 16 conversely becomes higher than the output voltage from the fuel cell 11. Therefore, step-up operation by the FC step-up converter 12 is required. In this case as well, however, by stepping up the voltage through the FC step-up converter 12 via a so-called soft switching processing, the switching loss during the operation of stepping up the voltage can be held as small as possible.

In the foregoing description, attention is focused only on the correlation between the fuel cell 11 and the motor 16 for convenience of explanation. However, as shown in FIG. 1, electric power can also be supplied from the battery 13 to the motor 16 in the fuel cell system 1. When electric power is supplied from the battery 13, the output voltage from the battery 13 is stepped up by the battery step-up converter 14 and then applied to the inverter 15. It should be noted herein that the battery step-up converter 14 is a so-called step-up converter, and that the voltage at an outlet of the battery step-up converter 14 (which is a voltage on the inverter 15 side and is equivalent to a voltage at an outlet of the FC step-up converter 12) must therefore be equal to or higher than a voltage at an inlet thereof (a voltage on the battery 13 side) in order to supply electric power from the battery 13 to the inverter 15.

Figure 4A:
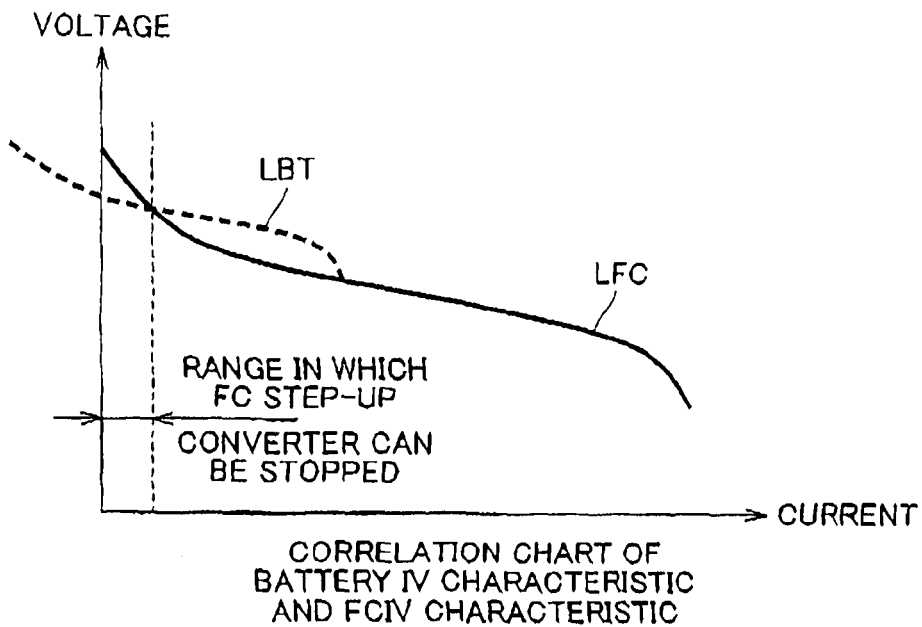
FIG. 4A is a first view showing a correlation between an I-V characteristic of the fuel cell and an I-V characteristic of a battery, which is set in the fuel cell system according to the embodiment of the invention.
Figure 4B:
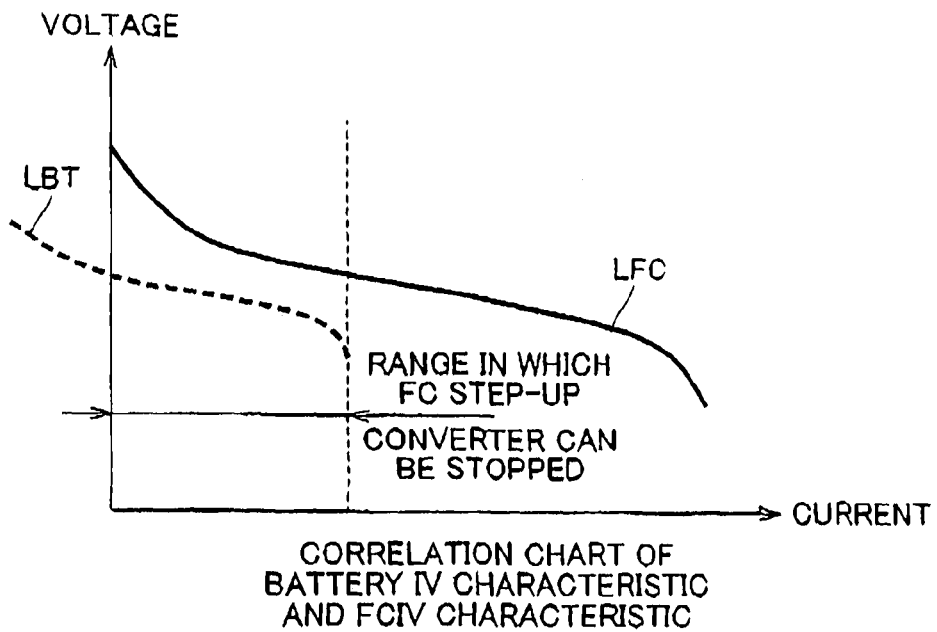
FIG. 4B is a second view showing a correlation between the I-V characteristic of the fuel cell and the I-V characteristic of the battery, which is set in the fuel cell system according to the invention.

Thus, a correlation between the output voltage of the battery 13 and the output voltage of the fuel cell 11 will be described on the basis of FIGS. 4A and 4B. In both the figures, an I-V characteristic of the battery 13 (indicated by dotted lines LBT in the figures) and an I-V characteristic of the fuel cell 11 (indicated by a solid line LFC in the figures) are shown. It should be noted herein that in a range where the I-V characteristic LFC of the fuel cell 11 is higher than the characteristic LBT of the battery 13 in FIG. 4A, the output voltage of the battery 13 is lower than the voltage at the outlet of the FC step-up converter 12 even when the FC step-up converter 12 is stopped. Therefore, the battery step-up converter 14 can perform step-up operation, and hence electric power can be supplied from the battery 13 to the motor 16. Accordingly, in this state, the FC step-up converter 12 is allowed to stop operating. On the other hand, in a range where the I-V characteristic LBT of the battery 13 is higher than the I-V characteristic LFC of the fuel cell 11, the output voltage of the battery 13 becomes higher than the voltage at the outlet of the FC step-up converter 12 when the FC step-up converter 12 is stopped. Therefore, output distribution control of the fuel cell 11 and the battery 13 through step-up operation of the battery step-up converter 14 cannot be performed. Accordingly, the FC step-up converter 12 is not allowed to stop operating in this state.

That is, in the case where the output voltage from the battery 13 is stepped up by the battery step-up converter 14 to apply the voltage to the motor 16, there needs to be formed a state in which the voltage at the outlet of the FC step-up converter 12 is higher than the voltage at the outlet of the battery 13 (the voltage at the inlet of the battery step-up converter 14). In some cases, therefore, the FC step-up converter 12 is not allowed to stop operating. For example, as shown in FIG. 4A, in a range of relatively low current, when the characteristic curve LFC of the fuel cell 11 is lower than the I-V characteristic curve LBT of the battery 13, the FC step-up converter 12 is not allowed to stop operating so as to ensure step-up operation of the battery step-up converter 14. As a result, the possibility of reducing the aforementioned switching loss decreases. On the other hand, for example, as shown in FIG. 4B, in the case where the characteristic curve LFC of the fuel cell 11 is always higher than the I-V characteristic curve LBT of the battery 13, the stoppage of the operation of the FC step-up converter 12 is not limited from the standpoint of ensuring step-up operation of the battery step-up converter 14.

The limitation on the operation of the FC step-up converter 12, which concerns the ensuring of step-up operation of the battery step-up converter 14 as mentioned above, results from the fact that the battery step-up converter 14 included in the fuel cell system 10 shown in FIG. 1 is a step-up type converter (i.e., a converter unable to perform step-down operation). Accordingly, in the fuel cell system 10, in the case where a step-up/step-down type converter capable of performing step-up operation and step-down operation is adopted instead of the battery step-up converter 14, the FC step-up converter 12 can selectively apply an output voltage from the fuel cell 11 or an output voltage from the battery 13 to the motor 16 without being bound by the aforementioned limitation on the operation.

Figure 5A:
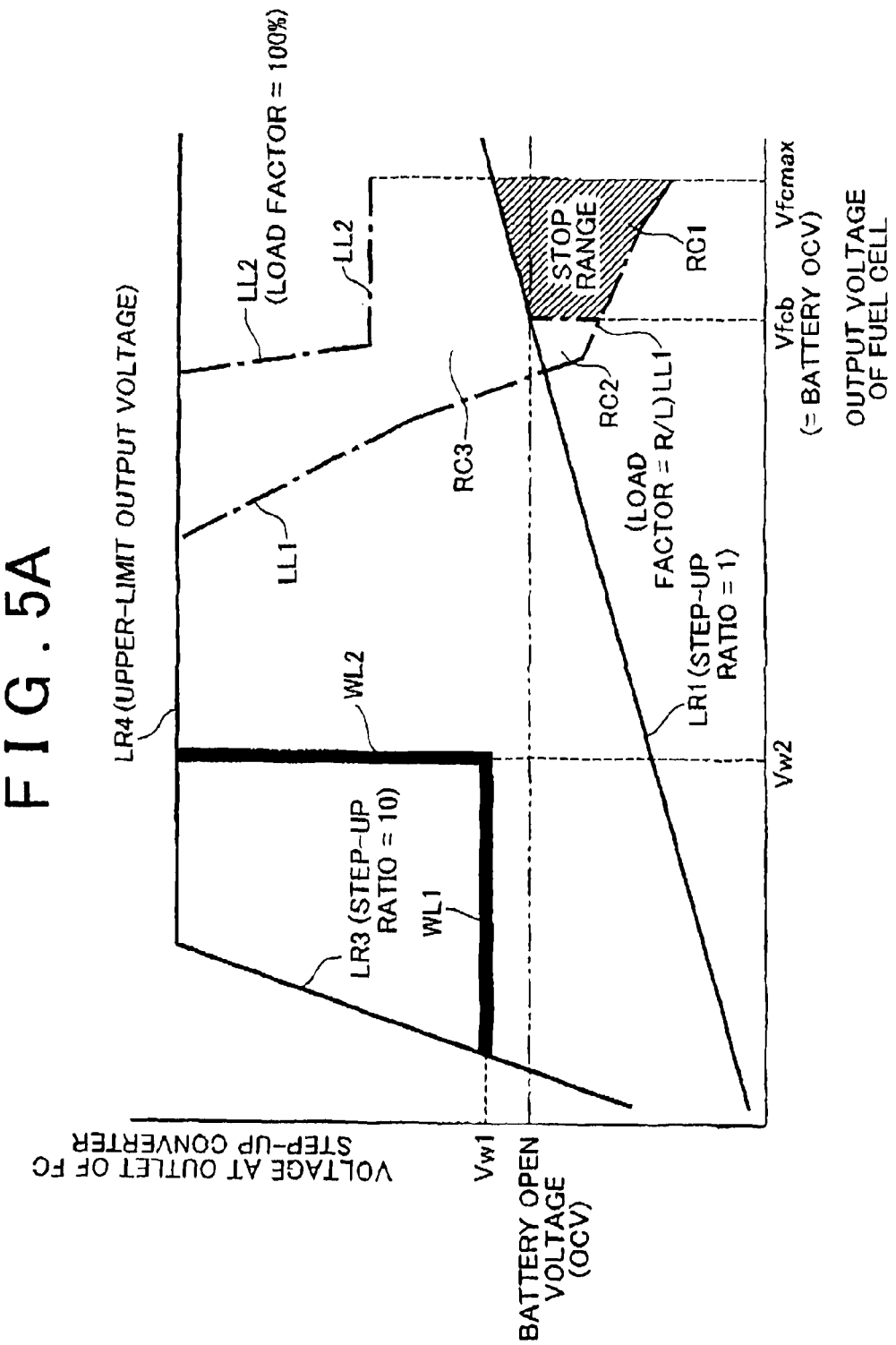
FIG. 5A is a first map indicating electric power generation of the fuel cell in association with step-up operation of an FC step-up converter for an operation range formed with an axis of abscissa representing the output voltage of the fuel cell and an axis of ordinate representing an output voltage of the FC step-up converter after step-up in the fuel cell system according to the embodiment of the invention.
Figure 5B:
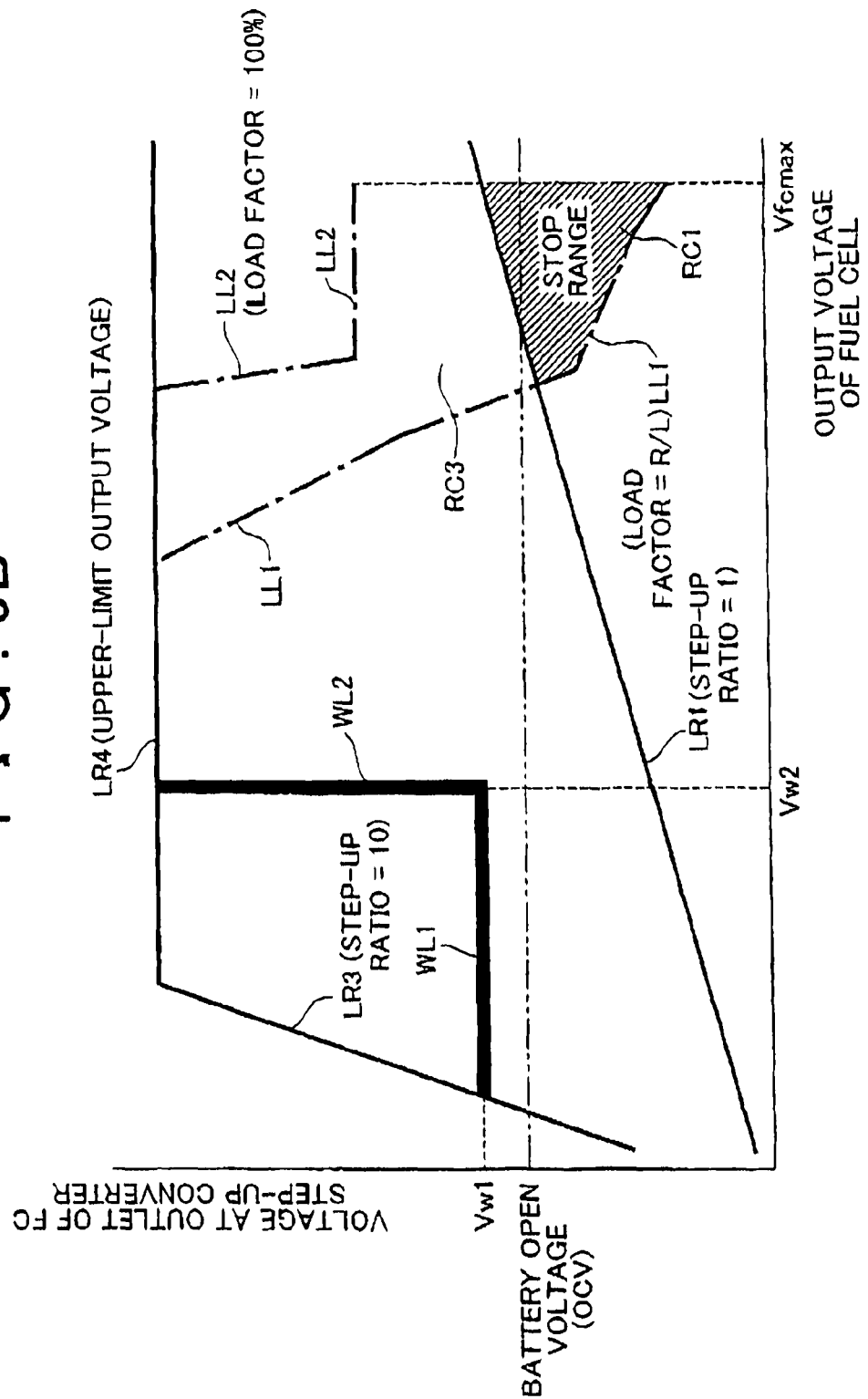
FIG. 5B is a second map indicating electric power generation of the fuel cell in association with step-up operation of the FC step-up converter for an operation range formed with an axis of abscissa representing the output voltage of the fuel cell and an axis of ordinate representing an output voltage of the FC step-up converter after step-up in the fuel cell system according to the embodiment of the invention.

Owing to the foregoing, in this embodiment of the invention, the required characteristic of the battery 13 and the required I-V characteristic of the fuel cell 11 are determined on the basis of the assumed driving of the vehicle 1, and an electric power generation range of the fuel cell 11, which is realized in the fuel cell system 10 as shown in maps of FIGS. 5A and 5B, is defined on the basis of a correlation between both the I-V characteristics and a relationship between the output voltage of the fuel cell 11 and the motor required voltage. The control regarding electric power generation of the fuel cell 11 will be described hereinafter in detail.

FIGS. 5A and 5B are maps each showing a processing regarding electric power generation of the fuel cell 11 in association with an operation range formed with an axis of abscissa representing an output voltage of the fuel cell 11 (an output voltage of the fuel cell 11) and an axis of ordinate representing a voltage at the outlet of the FC step-up converter 12 (a stepped-up voltage). FIG. 5A is a map in the case where the battery step-up converter 14 included in the fuel cell system 10 is a step-up type converter, and FIG. 5B is a map in the case where a step-up/step-down type converter is adopted instead of the step-up type battery step-up converter 14.

First of all, the map shown in FIG. 5A will be described. It should be noted herein that a line LR1 meaning that the step-up ratio by the FC step-up converter 12 is 1, namely, that the ratio between the output voltage of the fuel cell 11 and the output voltage of the FC step-up converter 12 is 1:1, a line LR3 meaning that the step-up ratio is 10, and a line LR4 meaning a maximum output voltage of the FC step-up converter 12 are depicted. The line LR3 represents a maximum step-up ratio by the FC step-up converter 12. Accordingly, it is understood that the operation range of the FC step-up converter 12 is a range surrounded by the lines LR1, LR3, and LR4.

It should be noted herein that in the assumed speed range of the vehicle 1, in the case where the load applied to the motor 16 is the lowest, namely, a load substantially equal to the friction resistance of a road is applied to the motor 16 (the load factor=R/L (Road Load) in the figure), a relationship between the output voltage of the fuel cell 11 and the output voltage of the FC step-up converter 12 is indicated by alternate long and short dash lines LL1. On the other hand, by the same token in the assumed speed range of the vehicle 1, in the case where the load applied to the motor 16 is high, namely, the accelerator opening degree of the vehicle 1 is 100% (the load factor is 100% in the figure), a relationship between the output voltage of the fuel cell 11 and the voltage at the outlet of the FC step-up converter 12 is indicated by alternate long and short dash lines LL2. Accordingly, in the fuel cell system 10 mounted on the vehicle 1, the FC step-up converter 12 is caused to perform step-up operation indicated by a range sandwiched between the alternate long and short dash lines LL1 and LL2 from the standpoint of "driving the motor 16 to cause the vehicle 1 to run". From the standpoint of the fuel cell 11, the range surrounded by these alternate long and short dash lines LL1 and LL2 is a range where normal electric power generation for driving the vehicle 1 as a load (which can be regarded as "normal electric power generation" in the invention) is carried out. This range is referred to as "a normal electric power generation range".

It should be noted herein that the aforementioned normal electric power generation range is classified into three ranges RC1 to RC3 in accordance with the operation state of the FC step-up converter 12 in FIG. 5A. In each of these ranges, a characteristic operation is performed as to the operation of the FC step-up converter 12. The following description will focus on the operation of the FC step-up converter 12 in each of the ranges. First of all, the range RC1 is defined as a range equal to or lower than the straight line LR1 indicating the step-up ratio 1. In this range RC1, the step-up ratio required for the driving of the motor 16 is equal to or smaller than 1 (since the FC step-up converter 12 is a step-up converter in reality, it should be noted that the step-up ratio cannot be made equal to or smaller than 1, namely, that the voltage cannot be stepped down). Therefore, as a result, the FC step-up converter 12 can be stopped, and the output voltage of the fuel cell 11 can be directly applied to the inverter 15. Thus, in a range RC1 in which the output voltage of the fuel cell 11 as the voltage at the inlet of the FC step-up converter 12 is in a range between a maximum voltage Vfcmax of the fuel cell 11 and a voltage Vfcb equal to an open circuit voltage (OCV) of the battery 13 and which is defined by being surrounded by the line LR1 and the alternate long and short dash lines LL1, step-up operation of the FC step-up converter 12 can be stopped completely. Thus, a switching loss in the FC step-up converter 12 can be held low. Thus, the stoppage of the operation of the FC step-up converter 12 is limited across the voltage Vfcb, with a view to ensuring step-up operation of the battery step-up converter 14, which is a step-up type converter as described above.

Next, the range RC2 will be described. This range is defined as a range where the voltage at the inlet of the FC step-up converter 12 is equal to or lower than Vfcb as described above and the voltage at the outlet of the FC step-up converter 12 is equal to or lower than the OCV of the battery 13, namely, equal to or lower than the same voltage as Vfcb. That is, in this range RC2, when step-up operation of the FC step-up converter 12 is not performed, the voltage at the outlet of the battery step-up converter 14 is lower than the voltage at the inlet thereof, and the battery step-up converter 14 cannot be performed. Further, in this range, even if the FC step-up converter 12 performs step-up operation, the battery step-up converter 14 cannot perform step-up operation by the same token because the step-up ratio of the FC step-up converter 12 is low. In the range RC2 defined as described above, as in the case of the range RC1, the FC step-up converter 12 is stopped to prevent the generation of a switching loss thereof. Then, the terminal voltage of the fuel cell 11 is controlled to a minimum voltage controllable by the battery step-up converter 14. In the figure, the aforementioned value Vfcb is set on the assumption that a voltage of an ideal step-up converter is equal to the OCV of the battery 13 when the ideal step-up converter is used. This state is continued as long as the electric power discharged from the battery 13 permits.

This range RC2 is a transient range that is interposed when the operation range of the FC step-up converter 12 shifts from the aforementioned range RC1 to a later-described range RC3. Accordingly, when the battery step-up converter 14 is a step-up type converter, it is preferable to appropriately adjust the correlation between the I-V characteristic of the fuel cell 11 and the I-V characteristic of the battery 13, which has been described on the basis of FIGS. 4A and 4B, such that this transient range RC2 becomes as small as possible.

Now, as for the range below the line LR1, the map shown in FIG. 5B, namely, the map in the case where a step-up/step-down type converter is adopted instead of the battery step-up converter 14 in the fuel cell system 10 will be described. In this case, the output voltage of the battery 13 can be stepped down by the step-up/step-down converter. Therefore, the stoppage of the operation of the FC step-up converter 12 is not limited by the aforementioned voltage Vfcb as described above. Accordingly, as shown in FIG. 5B, as for the range below the line LR1, it is easy to stop the operation of the FC step-up converter 12 without limitation and enhance the efficiency of the system. Accordingly, as a result, there is no range equivalent to the range RC2 in FIG. 5B. Furthermore, the following description of the control regarding electric power generation of the fuel cell system 11 is common to FIGS. 5A and 5B and hence will be given comprehensively.

In the operation range other than the ranges RC1 and RC2 as mentioned above, the FC step-up converter 12 is driven to perform the operation of stepping up the output voltage of the fuel cell 11. In this step-up operation, a so-called soft switching processing is performed, and the switching loss in the FC step-up converter 12 is held as small as possible. In this manner, in the normal electric power generation range surrounded by the alternate long and short dashes lines LL1 and LL2, the amount of electric power generation of the fuel cell 11 is controlled in accordance with the running state of the vehicle 1 as a load, and step-up operation of the FC step-up converter 12 is appropriately controlled on the basis of the correlation between the output voltage of the fuel cell 11 and the motor required voltage regarding the motor 16.

On the other hand, in the fuel cell 11, electric power is generated through an electrochemical reaction of hydrogen gas stored in the hydrogen tank 17 and oxygen in air force-fed by the compressor 18. When the temperature of the fuel cell 11 (which especially means the temperature of the electrolyte membrane in which the aforementioned electrochemical reaction occurs or diffusion layers of the respective gases, and will be referred to hereinafter simply as "the temperature of the fuel cell 11 itself") is in the vicinity of a temperature at which produced water can freeze, electric power generation in the fuel cell 11 is not carried out efficiently, and the output of the fuel cell 11 decreases in some cases. Thus, in the fuel cell system 10, in such a case, warm-up electric power generation different from the aforementioned normal electric power generation is carried out in the fuel cell 11 to raise the temperature of the fuel cell 11 itself and form an environment in which efficient electric power generation is possible. Warm-up electric power generation carried out in the fuel cell system 10 will be described hereinafter in detail.

Figure 6:
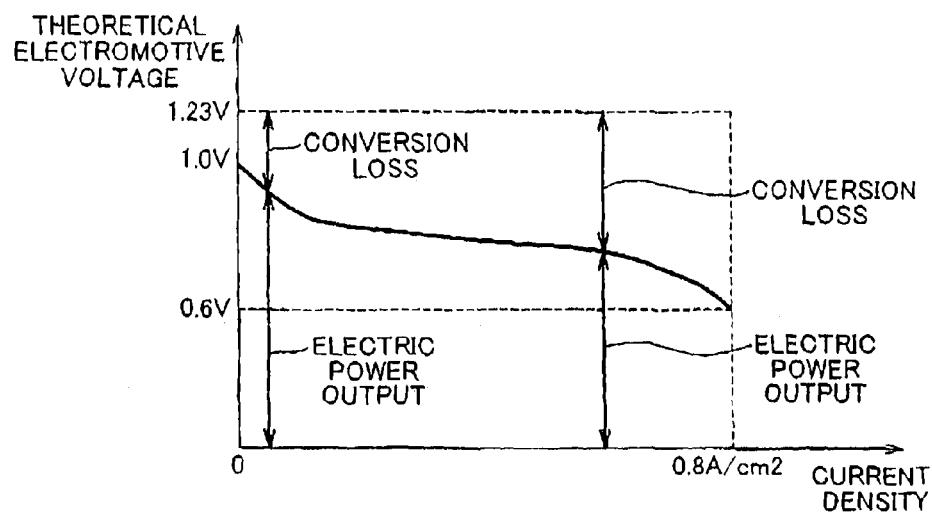
FIG. 6 is a view showing a correlation between an electric power output through electric power generation and a conversion loss as heat generation in the fuel cell in the fuel cell system according to the embodiment of the invention.

First of all, FIG. 6 is a view showing a correlation between a density of an output current and an output voltage, which is established through an electrochemical reaction at the time when hydrogen gas and air are applied to cells constituting the fuel cell 11. In FIG. 6, a theoretical electromotive voltage (1.23 V) is an output voltage based on a theoretical expression at the time when supplied hydrogen is entirely converted into electric energy. In fact, in the electrochemical reaction, since part of hydrogen energy is discharged as heat generation, the output voltage is lower than the theoretical electromotive voltage. In this embodiment of the invention, the output voltage is 1.0 V when the current density is 0, and the output voltage is 0.6 V when the current density is 0.8 A/cm$^2$. Thus, in the fuel cell 11, the output voltage fluctuates in accordance with the output current density. In other words, the efficiency of conversion of supplied hydrogen energy into electric power fluctuates in accordance with the operation state which is determined by output current and output voltage of the fuel cell 11. Thus, as shown in FIG. 6, the ratio between the output of electric power from the fuel cell 11 and a conversion loss as heat generation fluctuates in association with the operation state. More specifically, when the output current increases, the ratio of the conversion loss increases.

Figure 7:
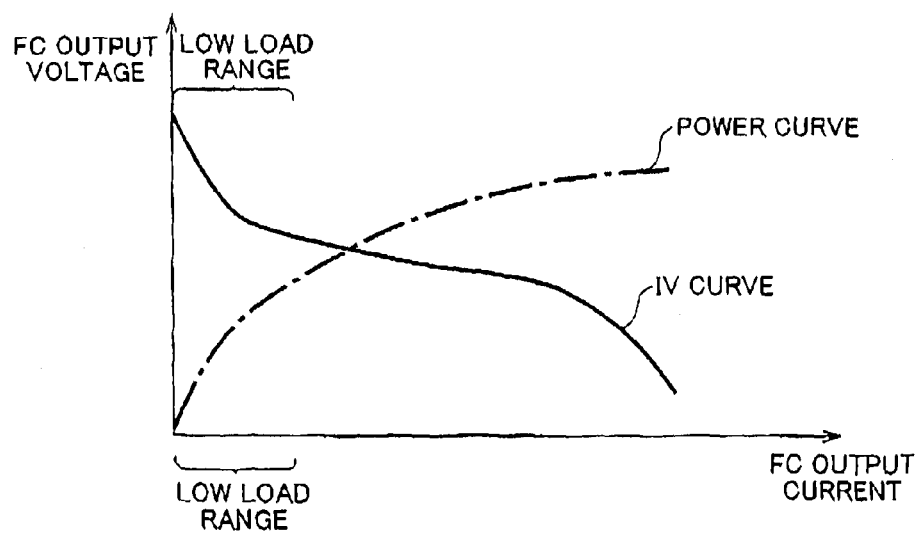
FIG. 7 is a view showing a current-voltage characteristic of the fuel cell in the fuel cell system according to the embodiment of the invention and an output characteristic resulting therefrom.

Now, a tendency of the current-voltage characteristic (I-V curve) of the fuel cell 11 and the output characteristic (power curve) calculated therefrom is shown in FIG. 7. Thus, in the fuel cell 11, the output voltage tends to decrease as the output current increases. On the other hand, although the output (power) of the fuel cell 11 increases, the increase rate thereof gradually decreases as the output current increases.

It should be noted herein that when the fuel cell 11 is laid under a low-temperature environment and the electric power generation efficiency thereof decreases, the fuel cell system 10 including the motor 16 as a load is driven in an idling state to raise the temperature of the fuel cell 11 and warm up the fuel cell 11 as in conventional cases. However, the output required for idle operation of the fuel cell system 10 is low. Therefore, the operation state of the fuel cell 11 at the time when the fuel cell 11 warmed up as described above is equivalent to the state of the low-load range shown in FIG. 7. Then, as is also apparent from FIG. 6, which has been mentioned above, in the operation state of the fuel cell 11 in this low load range, electric power generation can be efficiently carried out with a relatively small conversion loss. In other words, "electric power generation for warm-up" in the fuel cell 11 is inefficient. On the other hand, it is not preferable from the standpoint of reduction in energy consumption to drive the motor 16 in vain with no request for the driving of the motor 16 so as to raise the temperature of the fuel cell 11.

In this light, the fuel cell system 10 carries out warm-up electric power generation along a warm-up operation line WL1 shown in FIGS. 5A and 5B. Warm-up electric power generation along this warm-up operation line WL1 indicates a correlation between an operation state of the fuel cell 11 at the time when the motor 16 is in an idle operation state and the FC-side step-up converter 12 resulting therefrom. This warm-up electric power generation will be referred to hereinafter as "idle warm-up electric power generation". In this idle warm-up electric power generation, the fuel cell system 10 is in an idling operation state, namely, an extremely low-load state in which the operation of the fuel cell system 10 is barely maintained. Thus, during idle warm-up electric power generation, the step-up ratio of the FC step-up converter 12 is adjusted in accordance with the output voltage from the fuel cell 11 such that the voltage stepped up by the FC step-up converter 12 becomes equal to a constant voltage Vw1, which is slightly higher than the battery open voltage OCV. Thus, the voltage is applied to the motor 16 with step-up operation of the battery step-up converter 14 ensured.

Figure 8:
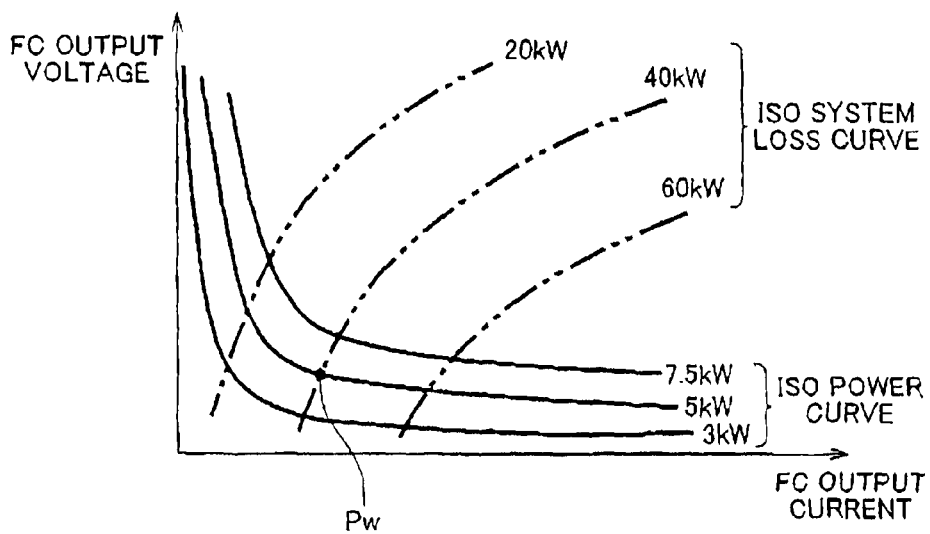
FIG. 8 is a view showing a correlation between iso system loss curves and iso power curves, which serves to determine an operation state of the fuel cell during idle warm-up electric power generation in the fuel cell system according to the embodiment of the invention.

Now, determination of the output voltage of the fuel cell 11 during the aforementioned idle warm-up electric power generation, namely, determination of the operation state of the fuel cell 11 will be described on the basis of FIG. 8. In FIG. 8, the axis of abscissa and the axis of ordinate respectively represent an output current and an output voltage as parameters determining the operation state of the fuel cell 11. It should be noted herein that iso power curves shown in FIG. 8 (in this embodiment of the invention, three iso power curves of 3 kW, 5 kW, and 7.5 kW are exemplified) are curves formed by connecting operation states assumable by the fuel cell 11 to achieve a certain output required for idle operation of the fuel cell system 10 (the output includes an output required for the driving of all the loads concerning the idle operation state of the vehicle 1). Accordingly, for example, when an output of 5 kW is required for idle operation of the motor 16, it is appropriate for the fuel cell 11 to assume one of the operation states on the iso power curve of 5 kW. Further, it is appropriate to measure these iso power curves in advance through an experiment or the like on the basis of the correlation between the fuel cell 11 and the motor 16.

Further, iso system loss curves shown in FIG. 8 (in this embodiment of the invention, three iso power curves of 20 kW, 40 kW, and 60 kW are exemplified) are curves formed by connecting operating points indicating possible operation states of the fuel cell 11 such that the system loss for raising the temperature of the fuel cell 11 as a result of the conversion loss shown in FIG. 6, namely, the system loss for heat generation is created through the electrochemical reaction in the fuel cell 11. Accordingly, for example, when heat of 40 kW needs to be discharged to warm up the motor 16 with a view to rendering the motor 16 in a predetermined state, it is appropriate for the fuel cell 11 to assume one of the operation states on the iso system loss curve of 40 kW. Furthermore, it is appropriate to measure these iso system loss curves in advance through an experiment or the like on the basis of a correlation between the fuel cell 11 and heat generation thereof.

On each of the iso system loss curves, as shown in FIG. 8, the output current of the fuel cell 11 increases as the loss thereof increases. This is because as the output current of the fuel cell 11 is increased, the conversion loss increases and the amount of heat generation required for warm-up that can be obtained increases, as shown in FIG. 6.

Owing to the foregoing, an operation state of the fuel cell 11 expressed as an intersection point of an iso power curve and an iso system loss curve means an operation state achieving compatibility between an output for idle operation and a system loss for warm-up, which correspond to the curves respectively. For example, the operation state expressed as an intersection point Pw of the iso power curve of 5 kW and the iso system loss curve of 40 kW means an operation state to be assumed by the fuel cell 11 during idle warm-up electric power generation, which makes it possible for the fuel cell 11 to perform both idle operation of 5 kW and warm-up operation of 40 kW. When this operation state to be assumed is determined, the flow rates of hydrogen gas, air, and the like, which are supplied to the fuel cell 11, are adjusted. The output current and output voltage in the fuel cell 11 are thereby adjusted.

It should be noted that when a larger system loss is required to warm up the fuel cell 11, the fuel cell 11 assumes an operation state in which the output voltage thereof is lower as shown in no. 8. However, the fuel cell system 10 is equipped with the FC step-up converter 12. Therefore, the voltage applied to the motor 16 through step-up operation of the FC step-up converter 12 can be raised to Vw1, and it is hence possible to ensure the driving of the motor 16 while ensuring step-up operation of the battery step-up converter 14. Further, it is desirable to set the value of the voltage Vw1 to a voltage that is equal to or higher than the battery open voltage OCV while making it possible to ensure a voltage required for the driving of all auxiliary motors and the like in the vehicle 1.

Then, in some cases, the vehicle 1 is required to run although the fuel cell 11 needs to be warmed up. Conventionally, in warming up the fuel cell 11, the vehicle 1 is required to stop, namely, remain in an idling state so as to give priority to warm-up. However, in the fuel cell 11, the vehicle 1 can run even when the fuel cell 11 is warmed up. Warm-up electric power generation of the fuel cell 11 in making it possible for this vehicle 1 to run is referred to as "running warm-up electric power generation". This running warm-up electric power generation is warm-up electric power generation carried out along a warm-up operation line WL2 shown in FIGS. 5A and 5B. On this warm-up operation curve WL2, the FC step-up converter 12 is so controlled as to hold the output voltage of the fuel cell 11 equal to a constant voltage Vw2. Also, step-up operation of the battery step-up converter 14 is controlled such that the output voltage of the FC step-up converter 12 becomes equal to or higher than the aforementioned voltage Vw1. Running warm-up electric power generation will be described hereinafter, focusing attention on the voltage Vw2.

When the fuel cell 11 is required to be warmed up, the current-voltage characteristic thereof has decreased. More specifically, as indicated by lines LIV1 and LIV2 in FIG. 9, the output voltage of the fuel cell 11 approaches zero as the output current thereof increases. The temperature of the fuel cell 11 itself, which has the current-voltage characteristic indicated by the line LIV2, is slightly higher than the temperature of the fuel cell 11, which has the current-voltage characteristic indicated by the line LIV1.

Figure 9:
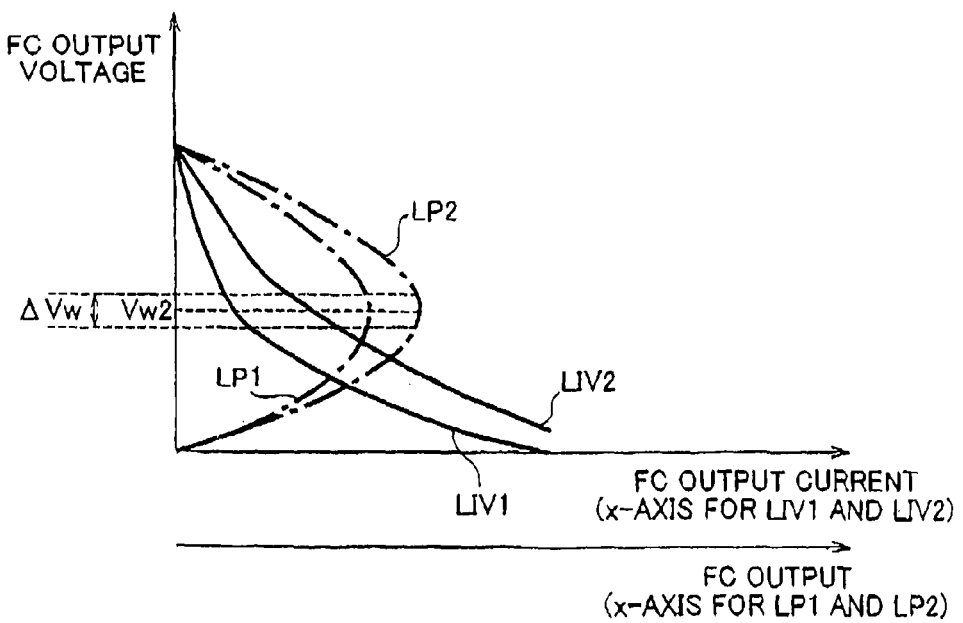
FIG. 9 is a view showing a current-voltage characteristic of the fuel cell and the output characteristic thereof at a time when the fuel cell needs to be warmed up.

Now, with the axis representing output voltage, the output of the fuel cell 11 in this state requiring warm-up is indicated by curves LP1 and LP2 in FIG. 9 (the curve LP1 corresponds to the current-voltage characteristic indicated by the line LIV1, and the curve LP2 corresponds to the current-voltage characteristic indicated by the line LIV2). These curves LP1 and LP2 are substantially similar to quadratic curves, and the output voltage corresponding to a peak value of the output of the fuel cell 11 tends to be confined within a relatively narrow voltage range ΔVw around Vw2. That is, when the fuel cell 11 needs to be warmed up, the output voltage corresponding to the peak value of the output of the fuel cell 11 gathers around the voltage Vw2. In other words, when the fuel cell 11 is warmed up, the output voltage of the fuel cell 11 is confined within the width of ΔVw around Vw2 or fixed to Vw2 even when the degree of necessity to warm up the fuel cell 11 more or less fluctuates. The output of the fuel cell 11 during warm-up can thereby be held in its maximum state or in a state extremely close to the maximum state (which can be regarded as "the predetermined high output state" according to the invention).

As described above, by rendering the output of the fuel cell 11 in the predetermined high output state even during warm-up, it is possible to respond to the required output for the running of the vehicle 1 as quickly as possible. In this case, in running warm-up electric power generation, the output voltage of the fuel cell 11 is held equal to the constant voltage Vw2 regardless of the temperature of the fuel cell 11, and the predetermined high output state is thereby formed. As a result, it is relatively easy to control the fuel cell 11 during the running warm-up electric power generation.

Further, if it is difficult to cover the output required by the vehicle 1 with the output from the fuel cell 11, it is appropriate to utilize the output from the battery 13. It should be noted herein that with a view to ensuring the output from the battery 13, step-up operation of the battery step-up converter 14 needs to be ensured. Hence, during running warm-up electric power generation, step-up operation of the FC step-up converter 12 is controlled such that the voltage stepped up by the FC step-up converter 12 becomes equal to or higher than a voltage higher than the battery open voltage OCV, for example, the aforementioned voltage Vw1. This does not hold true when the step-up/step-down type converter is employed instead of the battery step-up converter 14.

Figure 10:
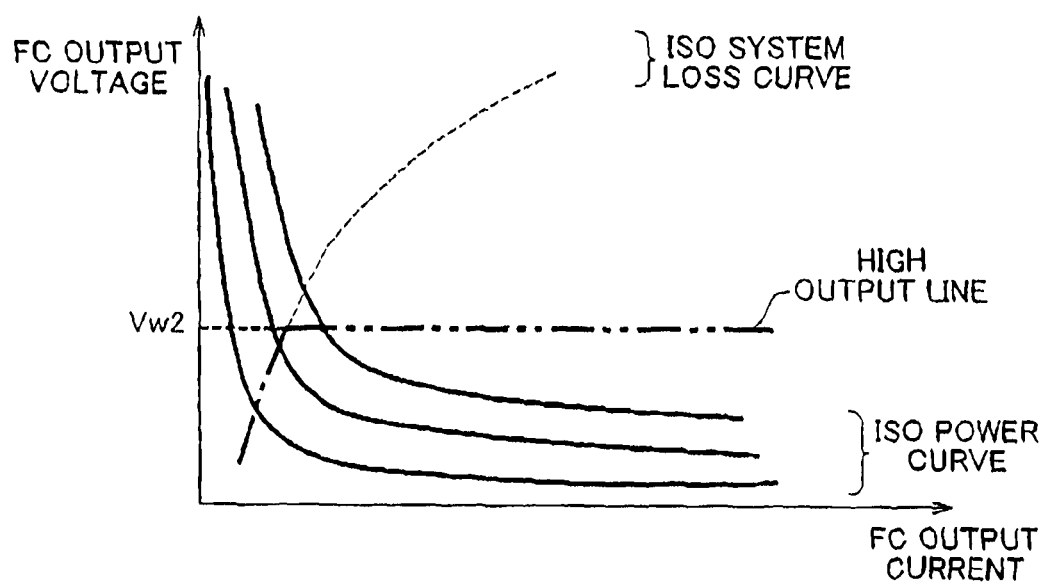
FIG. 10 is a view showing a correlation between an iso system loss curve and iso power curves, which serves to determine an operation curve of the fuel cell during running warm-up electric power generation in the fuel cell system according to the embodiment of the invention.

In view of the foregoing, the determination of the output voltage of the fuel cell 11 during running warm-up electric power generation, namely, the determination of the operation state of the fuel cell 11 will be described on the basis of FIG. 10. In FIG. 10 as well as FIG. 8, the axis of abscissa and the axis of ordinate respectively represent an output current and an output voltage as parameters for determining the operation state of the fuel cell 11. Further, iso power curves in FIG. 10 are depicted as to outputs required for the running of the vehicle 1, and only one iso system loss curve required for, for example, the prevention of the freezing of the system is depicted for convenience of explanation.

It should be noted herein that the operation state to be assumed by the fuel cell 11 is basically calculated in the same manner as in FIG. 8. However, in the calculation method shown in FIG. 10, a high output line is substituted for part of the iso system loss curve to be compared with the iso power curves. This high output line is determined on the basis of the output voltage Vw2, which renders the output of the fuel cell 11 in a state requiring warm-up in a predetermined high output state, and the constant output voltage Vw2 is obtained on the high output line regardless of the value of the output current. It should be noted herein that in the calculation method shown in FIG. 10, a curve formed of part of the iso system loss curve on a low output current side and part of the high output line on a high output current side with an intersection point of the high output line and the iso system loss curve serving as a base point is compared with the iso power curves. By thus determining the operation state of the fuel cell 11 during running warm-up electric power generation, the highest possible output can be supplied from the fuel cell 11 to drive the motor 16 while warming up the fuel cell 11.

In FIG. 10, part of the iso system loss curve is adopted as the curve on the low output current side, which is to be compared with the iso power curves because of the following reason. In a situation where the output required of the fuel cell system 10 by the vehicle decreases due to, for example, a stop at a traffic light or the like while the vehicle is running, the system loss becomes excessively small, and as a result, for example, it may become impossible to cover the system loss required for the prevention of the freezing of the fuel cell system 10. Further, when part of the iso system loss curve is compared with the iso power line while the minimum value of the output current of the fuel cell 11 is limited by, for example, the minimum flow rate of the compressor 18, an excessive output is obtained as a result, and there is an apprehension that the battery 13 may be charged excessively.

Adopting the concept described above, the operation state of the fuel cell 11 can be freely controlled on the basis of the system output of the fuel cell system 10 and the system loss required for warm-up of the fuel cell 11, without distinguishing between idle warm-up electric power generation and warm-up electric power generation during the running of the vehicle 1.

Figure 11:
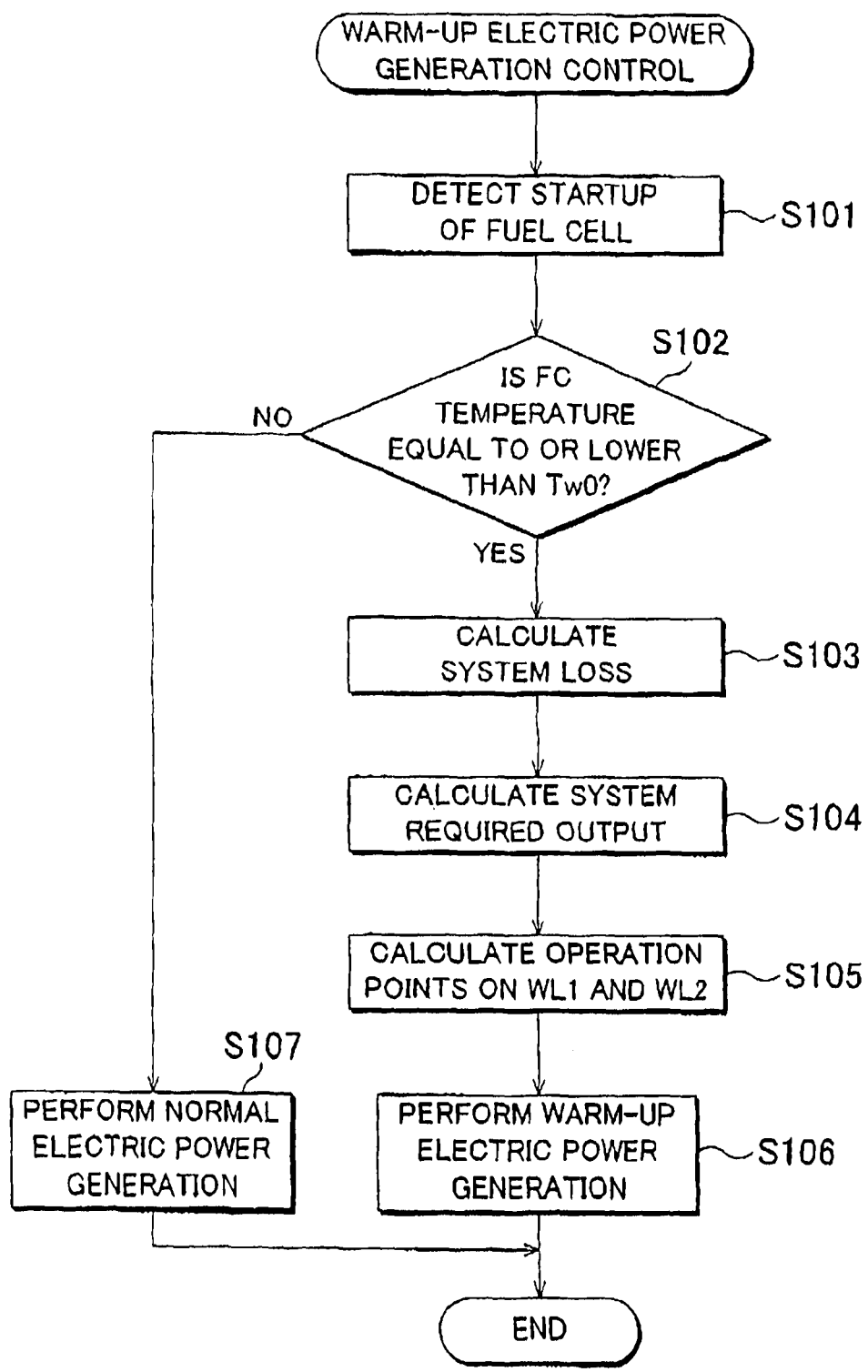
FIG. 11 is a flowchart about warm-up control for warming up the fuel cell in the fuel cell system according to the embodiment of the invention.

Now, electric power generation control for warming up the fuel cell 11, including the aforementioned idle warm-up electric power generation and the aforementioned running warm-up electric power generation, will be described on the basis of FIG. 11. Warm-up electric power generation control shown in FIG. 11 is performed by the ECU 20 when it is determined that the fuel cell 11 needs to be warmed up.

First of all, in S101, the startup of the fuel cell 11 is detected. More specifically, the ECU 20 detects the startup of the fuel cell 11 by detecting that an ignition switch has been turned ON by a user of the vehicle 1. Then in S102, it is determined whether or not the temperature of the fuel cell 11 itself is equal to or lower than a predetermined reference temperature TW0. The temperature of the fuel cell 11 itself is measured by a temperature sensor (not shown) at a location where an electrochemical reaction in the fuel cell occurs (the electrolyte membrane or the like) or at a location where the electrochemical reaction is likely to be affected (the gas diffusion layers or the like), and then is transmitted to the ECU 20. Further, the predetermined temperature Tw0 is a reference temperature at which it is determined that the freezing of water affects electric power generation in the electrochemical reaction of the fuel cell 11, and is set to, for example, 0° C. That is, it is determined in S102 whether or not the aforementioned warm-up electric power generation needs to be carried out in the fuel cell 11.

When the result of the determination in S102 is positive, the fuel cell 11 needs to be warmed up, and then a transition to S103 is made. In S103, a system loss required for warm-up of the fuel cell 11 is calculated. More specifically, the system loss is calculated according to the following equation.

(fuel cell loss)=(heat discharge coefficient)×((temperature of fuel cell 11 itself)−(outside air temperature))

(system loss)=(fuel cell loss)+(system auxiliary loss)

The outside air temperature is a temperature of outside air in a low-temperature environment to which the fuel cell 11 is exposed. By calculating a difference between the temperature of the fuel cell 11 itself and the temperature of outside air, a parameter as a base of energy required for warm-up is formed on the basis of a temperature gradient of the fuel cell 11 and outside air. By multiplying this temperature difference by the heat discharge coefficient, a fuel cell loss required for warm-up of the fuel cell 11 is calculated. This heat discharge coefficient is a parameter for converting the aforementioned temperature difference into the system loss, and is determined in consideration of the heat capacity and the like of the fuel cell 11. Furthermore, a system loss as a loss of the entire fuel cell system 10 is calculated as the sum of a system auxiliary loss for auxiliaries included in the fuel cell system 10 and the fuel cell loss such that the calculated required fuel cell loss is caused in the fuel cell 11. When the processing in S103 is terminated, a transition to S104 is made.

In S104, a warm-up output to be output as generated electric power by the fuel cell during warm-up, namely, a required output of the fuel cell system 10 required for the driving of the load including the motor 16 during warm-up is calculated. This output is calculated on the basis of a detection signal of the acceleration pedal sensor 21 or a speed of the vehicle or the like when the vehicle 1 is running. When the processing of S104 is terminated, a transition to S105 is made.

In S105, the operation state of the fuel cell 11 is determined along the aforementioned operation curves WL1 and WL2 (see FIGS. 8 and 10 as mentioned above). After that, in S106, warm-up electric power generation is carried out in the determined operation state.

When the result of the determination in S102 is negative, the fuel cell 11 does not need to be warmed up. Accordingly, in that case, a transition to S107 is made, and normal electric power generation is carried out in the fuel cell 11.

Further, the aforementioned warm-up electric power generation control is an exemplification of control performed in starting the fuel cell 11. However, this control may be applied when the fuel cell is in normal electric power generation operation. That is, even when the fuel cell 11 is in normal electric power generation operation, the aforementioned normal electric power generation is not always carried out. When the vehicle 1 is stopped or when the driving of the vehicle 1 can be covered by the output from the battery 13, normal electric power generation may be stopped in the fuel cell 11. After the continuation of this state in which normal electric power generation is stopped continues for some time, the temperature of the fuel cell 11 may become equal to or lower than the aforementioned predetermined reference temperature Tw0 due to the absence of heat generation in the fuel cell when the temperature difference from the outside air temperature assumes a certain value. Thus, in that case as well, the aforementioned warm-up electric power generation control, especially the processings in S102 to S107 are applied. The fuel cell 11 can thereby be warmed up efficiently.

When the temperature of the fuel cell 11 reaches a warm-up end temperature at which there is no possibility of refreezing even after the end of warm-up electric power generation because the warm-up electric power generation has been carried out through the processing of S106, a mode of electric power generation by the fuel cell 11 may be shifted from warm-up electric power generation to normal electric power generation. In this manner, useless consumption of energy resulting from a long-time continuation of warm-up electric power generation with relatively low electric power generation efficiency can be avoided.

<Other Embodiment>It should be noted herein that in warm-up electric power generation in the fuel cell 11, the balance between fuel gas and oxidizing gas supplied from the hydrogen tank 17 and the compressor 18 may be adjusted. For example, the concentration of oxidizing gas supplied to the fuel cell 11 is made lower than that of fuel gas, and as a result, the amount of oxygen supplied to the fuel cell 11 is made somewhat insufficient. Thus, the electric power generation efficiency of the fuel cell 11 is reduced. In consequence, heat generation is promoted and warm-up can be carried out.

However, when the amount of oxygen supplied to the fuel cell 11 is made somewhat insufficient as described above, there may be caused a hydrogen pumping phenomenon in which hydrogen gas supplied to an anode side of the fuel cell 11 is not bonded to a sufficient amount of oxygen after having moved to a cathode side of the fuel cell 11 through the electrolyte membrane thereof as protons, and forms hydrogen molecules again. Due to this hydrogen pumping phenomenon, hydrogen may be discharged to the outside as off gas on the cathode side. Therefore, the occurrence of this phenomenon is not desirable.

Therefore, in this embodiment of the invention, the operation state of the fuel cell 11 is so determined as to minimize the possibility of the occurrence of the hydrogen pumping phenomenon. More specifically, it has been found out that the concentration of hydrogen produced on the cathode side of the fuel cell 11 due to the hydrogen pumping phenomenon tends to rise as the operation voltage of the fuel cell 11 is reduced to achieve an output required for warm-up of the fuel cell 11. Thus, it is preferable to limit the minimum value of the operation voltage of the fuel cell during warm-up electric power generation to a voltage value at which the value of the concentration of hydrogen produced due to the hydrogen pumping phenomenon is equal to or smaller than a permissible value when the aforementioned electric power generation control is performed. More preferably, the minimum value of the operation voltage of the fuel cell 11 during the warm-up electric power generation may be limited to a voltage value at which the hydrogen pumping phenomenon does not occur in the fuel cell 11.

The invention claimed is:

1. A fuel cell system comprising:
a drive motor;
a fuel cell that supplies the drive motor with electric power; and
a controller configured to:
perform normal electric power generation under a condition in which the fuel cell is not warmed up;
perform warm-up electric power generation with lower electric power generation efficiency than the normal electric power generation to cause a system loss for warming up the fuel cell;
control performance of warm-up electric power generation on a basis of a predetermined index on a necessity to warm up the fuel cell, and
control an operation state of the fuel cell during warm-up electric power generation on a basis of a correlation between the system loss required for warm-up of the fuel cell and a warm-up output required for driving of a load including the drive motor during warm-up of the fuel cell,
wherein the controller is configured to control the operation state of the fuel cell on a basis of (i) a first predetermined curve that shows the system loss required for warm-up of the fuel cell, and (ii) a second predetermined curve that shows the warm-up output required for driving of the load including the drive motor during warm-up of the fuel cell.

2. The fuel cell system according to claim 1, wherein the controller is configured to set, as an operation state of the fuel cell during warm-up electric power generation, a predetermined operation state ensuring compatibility between an operation state of the fuel cell in which an output corresponding to the warm-up output can be supplied and an operation state of the fuel cell in which the system loss required for warm-up of the fuel cell is caused.

3. The fuel cell system according to claim 1, wherein the controller is configured to
set up an output voltage of the fuel cell to a predetermined drive voltage required for driving of the drive motor during warm-up of the fuel cell, and supplies the drive motor with the output voltage.

4. The fuel cell system according to claim 1, wherein the controller is configured to adjust a magnitude of the system loss for the operation state of the fuel cell on a basis of a predetermined difference between an outside air temperature of the fuel cell and a temperature of the fuel cell itself for the operation state of the fuel cell, and controls the operation state of the fuel cell during warm-up electric power generation on a basis of the adjusted system loss and the warm-up output.

5. The fuel cell system according to claim 1, wherein the controller is configured to control the operation state of the fuel cell during warm-up electric power generation to an operation state determined on a basis of a current-voltage characteristic of the fuel cell in a state requiring warm-up to render an output of the fuel cell in a predetermined high output state when the warm-up output is higher than a predetermined value.

6. The fuel cell system according to claim 5, wherein the controller is configured to control the operation state of the fuel cell during warm-up electric power generation such that the output voltage of the fuel cell becomes equal to a certain predetermined output voltage that renders the output of the fuel cell in the predetermined high output state on a basis of the current-voltage characteristic of the fuel cell in the state requiring warm-up.

7. The fuel cell system according to claim 5, wherein
the fuel cell system is mounted on a mobile object, the mobile object being driven by the drive motor, and
the predetermined value is a minimum value required during movement of the mobile object in warming the fuel cell.

8. The fuel cell system according to claim 1, wherein the controller is configured to perform warm-up electric power generation of the fuel cell such that a system heat budget in the fuel cell during warm-up becomes equal to or larger than zero.

9. The fuel cell system according to claim 1, wherein the controller is configured to perform warm-up electric power generation when the fuel cell is started or when the normal electric power generation is performed in the fuel cell and the temperature of the fuel cell itself becomes equal to or lower than a predetermined temperature requiring warm-up.

10. The fuel cell system according to claim 1, wherein the controller is configured to shift electric power generation in the fuel cell to normal electric power generation when the temperature of the fuel cell itself becomes equal to a warm-up end temperature through warm-up electric power generation.

11. The fuel cell system according to claim 1, wherein
the controller is configured to make a concentration of oxygen supplied to the fuel cell lower than a concentration of oxygen supplied to the fuel cell during the normal electric power generation to thereby perform the warm-up electric power generation, and
the controller is configured to limit a minimum operation voltage of the fuel cell to a hydrogen pumping suppression voltage at which a concentration of hydrogen produced on a cathode side of the fuel cell as a result of the warm-up electric power generation is equal to or lower than a predetermined reference concentration in controlling the operation state of the fuel cell during warm-up electric power generation.

12. The fuel cell system according to claim 1, wherein the first predetermined curve is determined by an output current and an output voltage of the fuel cell, and the second predetermined curve is determined by an output current and an output voltage of the fuel cell.

13. The fuel cell system according to claim 12, wherein the controller is configured to control the operation state of the fuel cell in accordance with an intersection of the first predetermined curve and the second predetermined curve.

14. A method of controlling a fuel cell system equipped with a drive motor and a fuel cell that supplies the drive motor with electric power, comprising:
determining whether or not the fuel cell needs to be warmed up;
calculating a system loss required for warm-up of the fuel cell;
calculating a warm-up output required for driving of a load including the drive motor during warm-up of the fuel cell; and
controlling an operation state of the fuel cell during warm-up electric power generation on a basis of the calculated system loss and the calculated warm-up output when it is determined that the fuel cell needs to be warmed up,
wherein controlling the operation state of the fuel cell is performed on a basis of (i) a first predetermined curve that shows the system loss required for warm-up of the fuel cell, and (ii) a second predetermined curve that shows the warm-up output required for driving of the load including the drive motor during warm-up of the fuel cell.

15. The method according to claim 14, wherein the first predetermined curve is determined by an output current and an output voltage of the fuel cell, and the second predetermined curve is determined by an output current and an output voltage of the fuel cell.

16. The method according to claim 15, wherein controlling the operation state of the fuel cell is performed in accordance with an intersection of the first predetermined curve and the second predetermined curve.

17. A fuel cell system comprising:
a drive motor;
a fuel cell that supplies the drive motor with electric power; and
a controller configured to:
perform normal electric power generation under a condition in which the fuel cell is not warmed up;
perform warm-up electric power generation with lower electric power generation efficiency than the normal electric power generation to cause a system loss for warming up the fuel cell;
control performance of warm-up electric power generation on a basis of a predetermined index on a necessity to warm up the fuel cell,
control an operation state of the fuel cell during warm-up electric power generation on a basis of a correlation between the system loss required for warm-up of the fuel cell and a warm-up output required for driving of a load including the drive motor during warm-up of the fuel cell;
make a concentration of oxygen supplied to the fuel cell lower than a concentration of oxygen supplied to the fuel cell during the normal electric power generation to thereby perform the warm-up electric power generation, and
limit a minimum operation voltage of the fuel cell to a hydrogen pumping suppression voltage at which a concentration of hydrogen produced on a cathode side of the fuel cell as a result of the warm-up electric power generation is equal to or lower than a predetermined reference concentration in controlling the operation state of the fuel cell during warm-up electric power generation.

18. A method of controlling a fuel cell system equipped with a drive motor and a fuel cell that supplies the drive motor with electric power, comprising:
determining whether or not the fuel cell needs to be warmed up;
calculating a system loss required for warm-up of the fuel cell;
calculating a warm-up output required for driving of a load including the drive motor during warm-up of the fuel cell;
controlling an operation state of the fuel cell during warm-up electric power generation on a basis of the calculated system loss and the calculated warm-up output when it is determined that the fuel cell needs to be warmed up;

making a concentration of oxygen supplied to the fuel cell lower than a concentration of oxygen supplied to the fuel cell during the normal electric power generation to thereby perform the warm-up electric power generation, and limiting a minimum operation voltage of the fuel cell to a hydrogen pumping suppression voltage at which a concentration of hydrogen produced on a cathode side of the fuel cell as a result of the warm-up electric power generation is equal to or lower than a predetermined reference concentration in controlling the operation state of the fuel cell during warm-up electric power generation.

* * * * *